Figure 1:
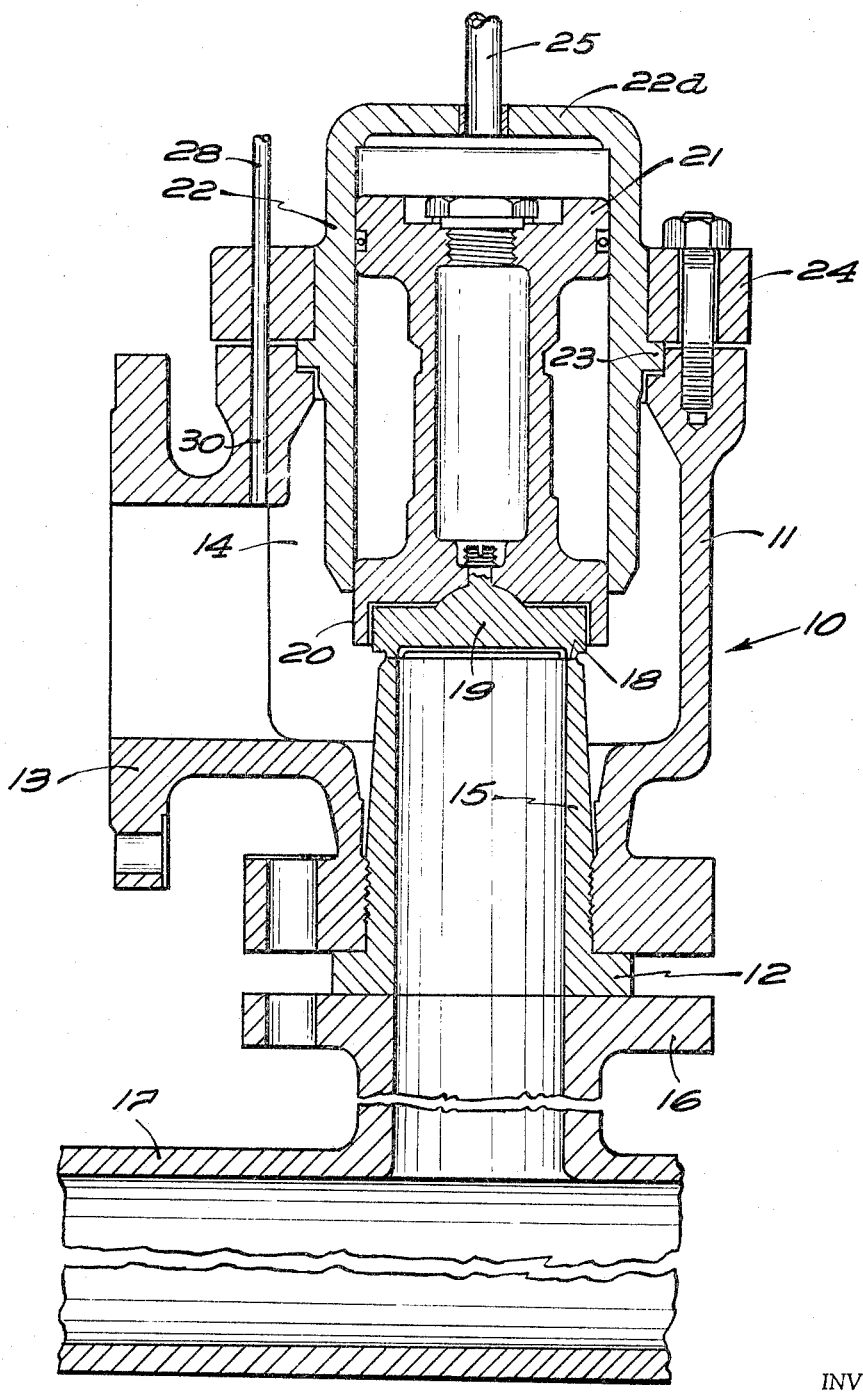

3,269,407
SAFETY VALVE
Victor W. Farris, 104 Woodland St., Englewood, N.J.
Filed June 10, 1965, Ser. No. 462,998
1 Claim. (Cl. 137—489)

This invention relates to safety valves and constitutes a continuation-in-part of my copending application Ser. No. 201,359, filed June 11, 1962, now abandoned and my copending application, Ser. No. 434,175, filed February 16, 1965, and now Pat. No. 3,221,765 as a substitute for my application, Ser. No. 275,161, filed April 23, 1963.

The present invention enables the operation of safety valves within a narrow pressure band. The valve remains positively closed without simmer until set pressure is reached, at which time the valve opens instantaneously to full capacity without, as has previously been the case, the necessity for any overpressure. The valve remains open until a predetermined closing pressure is reached, closer than 99% of opening pressure is desired, at which time, closure takes place without chatter, hum or leakdown.

Construction and operation are such that if normal pressure controlling instrumentation should permit momentary pressure rises, the valve opens to maximum at once and immediately closes again. If the opening is in response to a real emergency rather than such a momentary rise, the valve remains open until the emergency passes, allowing pressure increase only to that for which the valve was sized.

The foregoing advantageous method of operation is achieved in the following manner, it being assumed that the valve is being used to relieve excessive pressure in a fluid processing system having continuous flow of a fluid through a conduit.

A main valve has the usual inlet and outlet ports and a main valve disc controlling communication therebetween. A piston is slidable in the body of the main valve and is operatively connected with the main valve disc. The main valve disc and the piston are both exposed to the pressure of the fluid flowing through the conduit to provide first and second forces in directions tending, respectively, to open and close the disc. However, the relative areas of the disc and the piston are such that the closing force on the piston is greater than the opening force on the disc and the latter remains closed.

A means is provided for controlling the exposure of the piston to the conduit fluid pressure whereby when such pressure reaches a predetermined value, the closing force against the piston is reduced to below the opening force against the disc and the latter immediately opens to its full capacity to relieve the excessive conduit pressure.

The last-named means includes an auxiliary valve having an inlet port and two outlet ports; the inlet port being connected, through an adjustable reducing valve, to the above referrend to conduit, one of the outlet ports being connected to the body of the main valve above the piston therein, and the other outlet port being connected to discharge.

A plunger, carrying an auxiliary valve disc, is slidable in the auxiliary valve, the auxiliary valve disc cooperating with a seat formed in said valve to control communication between the two outlet ports of the valve.

A chamber, formed in the auxiliary valve, communicates through a passage in the plunger with the inlet port of the auxiliary valve, and the relative areas of the auxiliary disc and the last-named seat are such that when the pressure of fluid in the auxiliary valve chamber reaches the set opening pressure of the entire system, the auxiliary valve disc commences to open whereby the force developed against such disc becomes amplified. This amplification causes the disc to instantaneously achieve maximum lift to establish maximum communication between the two outlet ports of the auxiliary valve.

When this occurs, the suddent drop in pressure in the auxiliary valve chamber permits the fluid previously exerting force against the piston in the main valve and holding the main valve disc closed to reverse its course and escape through the two outlet ports of the auxiliary valve to discharge. The latter event permits the main valve to open, whereby the excessive pressure in the main stream of fluid in the conduit is relieved through the outlet port of the main valve.

The main valve discharge condition continues until the pressure of the conduit fluid is reduced to a selectively controlled pressure below the system set opening pressure.

All during the main discharge, fluid from the conduit continues to flow to the auxiliary chamber of the auxiliary valve, but the open auxiliary valve disc renders the pressure of this fluid ineffective to act against the main valve piston. However, when the system pressure is reduced to set pressure, the auxiliary valve disc closes and the fluid flowing into the auxiliary valve chamber through the reducing valve builds up a pressure which is once again applied to the main valve piston to close the main valve disc. At this time, conditions are back to normal.

In the following specification there is described, and in the accompanying drawings shown, an illustrative embodiment of the present invention.

Figure 2:
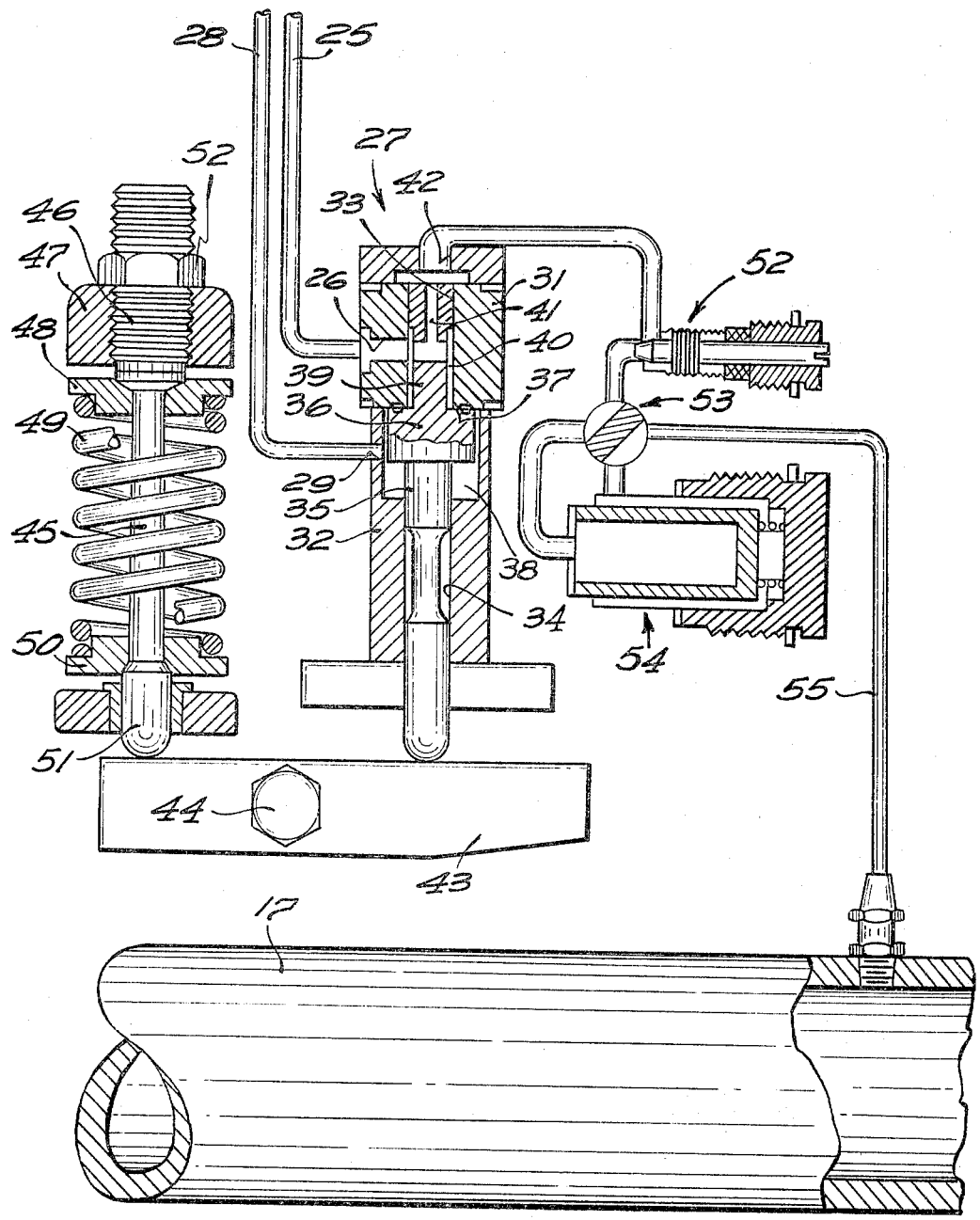

In said drawings, FIG. 1 is a vertical sectional view taken substantially through the center of the main valve of said embodiment, and FIG. 2 is a partial longitudinal, partial elevational view of the auxiliary valve of said embodiment, including the connections to main conduit and the connections between such auxiliary valve and the main valve.

Referring now more in detail to the aforesaid illustrative embodiment of the present invention, particularly to FIG. 1 and FIG. 2 of the drawings thereof, the numeral 10 generally designates a safety valve which includes a main valve body 11 provided with a flanged inlet 12 and a flanged outlet 13 in communication with each other through a main body chamber 14.

The inlet 12 has secured therein a nozzle 15 of uniform internal diameter corresponding to the internal diameter of a flanged outlet 16 formed on a conduit 17 through which flows the fluid the pressure of which it is intended to control by the valve of the present invention.

A valve seat 18 is formed at the inner end of the nozzle 15 and a valve disc 19 cooperates with said seat to control communication between the inlet and the outlet of the main valve body 11.

The valve disc 19 is carried in a disc holder 20, in turn, carried by a piston 21 which is slidably mounted in a cylinder 22, the latter having a dome 22a closing its upper end and being provided with a flange 23 by means of which it is secured on the upper end of the body 11 by a clamping ring 24.

A pipe 25 has one end communicating through the dome 22a with the interior of the cylinder 22 above the piston 21, the other end of this pipe communicating with an outlet port 26 of an auxiliary or pilot valve 27. Another pipe 28 has one end connected with another outlet port 29 of the auxiliary valve 27, the other end of this pipe being connected to a discharge passage 30 formed in the outlet 13 of the main valve body 14.

The auxiliary valve 27 includes upper and lower body portions 31 and 32 provided, respectively, with coaxially disposed cylindrical bores 33 and 34. Slidably mounted in the bores 33 and 34 is a plunger 35 on which is formed an auxiliary valve disc 36 cooperable with a seat 37 formed on the lower surface of the upper body portion 31 of the valve 27. The disc 36 is housed in a chamber 38 formed in the lower body portion 32 of the valve 27 and communicating through the port 29 with the discharge pipe 28.

The plunger 35 is provided with a reduced portion 39 which, when the disc 36 is closed against the seat 37, forms a chamber 40 communicating through a passage 41 in the plunger 35 with an auxiliary valve inlet port 42.

The lower end of the plunger 35 bears against one end of a lever 43, which is pivotally mounted, as at 44, the other end of said lever bearing against a stem 45 slidably mounted in a cylinder 46 threadedly engaged in a supporting member 47.

A spring button 48 bears against the lower end of the cylinder 46 and receives the upper end of a coil spring 49, the lower end of the spring engaging another button 50 which bears against an enlarged portion 51 formed on the stem 45.

A lock nut 52 threadedly engages the cylinder 46 so that after adjustment of the cylinder 46 in the supporting member 47 to adjust the pressure of the spring 47 against the enlarged portion 51 of the stem 45, such cylinder can be locked in its adjusted position. Thus, the disc 36 is maintained closed against the seat 37 by a predetermined pressure exerted by the spring 49 and transmitted to such disc through the pivoted lever 43 and plunger 35.

The inlet port 42 of the auxiliary valve 27 is connected to the outlet of an adjustable reducing valve 52, the inlet of said reducing valve being connected, through a conventional 4-way valve 53, either directly, or by way of a filter 54, to a pipe 55 coupled to the conduit 17 on the upstream side of the main valve 10. Normally, the position of the 4-way valve 53 will be such as to pass fluid from the pipe 55 to the reducing valve 52 through the filter 54. However, by rotating the 4-way valve through 90 degrees, the fluid from the pipe 55 can be fed directly to the reducing valve 52, by-passing the filter 54 when the latter requires cleaning or replacement without interrupting the continuous processing of the fluid.

This completes the description of the aforesaid illustrative embodiment of the present invention and its operation will now be described.

A portion of the fluid flowing through the conduits 17 enters the nozzle 15 of the main valve 10 and exerts a force against the valve disc 19 in a direction tending to open said disc.

Another portion of the fluid passes through the pipe 55 and, depending upon the position of the 4-way valve 53, either directly or through the filter 54, to the reducing valve 52. The valve 52 is adjusted, as will later be better understood, to control the duration of the blowdown condition of the main valve 10.

In any event, the fluid reaching the valve 52, passes through the same at a reduced pressure and enters the auxiliary valve 27 by way of the inlet port 42.

Such fluid flows through the passage 41 in the plunger 39 and fills the chamber 40 to exert the pressure of the main stream of the fluid flowing through the conduit 17 against that portion of the surface of the auxiliary valve disc 36 that is not covered by the seat 37.

The auxiliary valve disc 36 is maintained in its closed position against the seat 37 by the force exerted by the spring 49, through the stem 45 and pivoted lever 43, against the lower end of the plunger 35. This spring force is adjusted to correspond to the pressure at which it is desired to protect the system.

A portion of the fluid from the plunger passage 41 exits from the auxiliary valve 27 via the outlet port 26 and, by way of the pipe 25, enters the cylinder 22 of the main valve 10. Here, it exerts mainstream pressure against the piston 21 which, because the area of such piston is greater than the area of the disc 19, develops a force sufficient to maintain the disc 19 closed against the seat 18.

There has thus been described a static condition which remains unaltered as long as the system pressure does not reach set pressure as determined by the adjustment of the spring 49.

When the system pressure does reach set pressure, the auxiliary valve disc 36 commences to move away from the seat 37 against the force exerted by the spring 49 and when this occurs, the fluid from the chamber 40 is able to exert its pressure against a greatly increased area of the disc, which brings about an immediate opening to maximum of the auxiliary valve 27.

This action produces a sharp drop in the pressure above the piston 21 of the main valve. The fluid above such piston reverses its course and flows through the pipe 25, chamber 40, past the disc 36 into the chamber 38 from whence it flows through the pipe 28 and passage 30 in the outlet 13 of the main valve 10 to discharge.

At this time, the main valve disc 19 is no longer held closed by the static condition previously described and system pressure urged against said disc opens the same to permit fluid in the conduit 17 to pass from the inlet 12 to the outlet 13, thus relieving the excessive system pressure.

When the cause of the excessive system pressure has been removed and system pressure returns to normal, the spring 49 causes the auxiliary valve disc 36 to close against the seat 37. However, because of the restricted orifice of the reducing valve 52, it takes a while before fluid can again build up suffiicent pressure above the piston 21 to close the main valve disc 19. Thus, the adjustment of the reducing valve 52 controls the length of blow-down.

This completes the description of the operation of the safety valve of the present invention.

What is claimed is:

A pilot-controlled safety valve for relieving excessive pressure of fluid flowing through a conduit comprising a main valve body having inlet and outlet ports; a main valve disc controlling communication between said inlet and outlet ports; a piston slidably mounted in said main valve body and operatively connected to said main valve disc; said main valve disc and said piston being adapted to be exposed to the pressure of said fluid whereby first and second forces may be exerted against said main valve disc in directions tending, respectively, to open and close the same; the relative areas of said main valve disc and said piston being such that said second force will normally exceed said first force initially to hold said main valve disc closed and prevent communication between said inlet and outlet ports; and means, adapted to be connected to said conduit and responsive to the pressure of said fluid, for controlling the exposure of said piston to said fluid whereby when the pressure of said fluid reaches a predetermined magnitude, said second force is reduced to a value below said first force and said main valve disc is opened to establish communication between said inlet and outlet ports thereby relieving the excessive pressure of said fluid, and whereby when the pressure of said fluid subsequently drops below said predetermined magnitude, said normal differential between said second and first forces is reestablished to close said main valve disc and discontinue communication between said inlet and outlet ports; said means including an auxiliary valve body having an auxiliary inlet port and first and second auxiliary outlet ports; said auxiliary inlet port being adapted to be connected to said conduit, said first auxiliary outlet port being connected to said main valve body above said piston, and said second auxiliary outlet port being connected to said main outlet port of said main valve body; a plunger slidably mounted in said auxiliary valve body; an auxiliary valve disc, carried by said plunger and cooperable with an auxiliary valve seat formed in said auxiliary valve body, for controlling communication between said first and second auxiliary outlet ports; said plunger having a reduced portion which, together with the adjacent walls of said auxiliary valve body and a portion of said auxiliary valve disc, provide a chamber communicating, through a passage in said plunger, with said auxiliary inlet port and with said first auxiliary outlet port; the relative areas of said auxiliary valve disc and said auxiliary valve seat being such that when the pressure of fluid in said chamber and applied against said auxiliary valve disc reaches said predetermined magnitude, said auxiliary valve disc commences to open whereby the force developed against said auxiliary valve disc is amplified to cause said auxiliary valve disc instantaneously to achieve its optimum lift and thereby establish maximum communication between said first and second auxiliary outlet ports.

References Cited by the Examiner

UNITED STATES PATENTS

| | | | |
|---|---|---|---|
| 2,580,128 | 12/1951 | Renick | 137—489 |
| 2,759,488 | 8/1956 | Garrett et al. | 137—491 |
| 2,890,714 | 6/1959 | Greenwood et al. | 137—491 X |
| 3,211,174 | 10/1965 | Weise et al. | 137—469 |

OTHER REFERENCES

Anderson, Greenwood Co., Catalog 1530, Safety-Relief Valves (Pilot Operated), January 1963.

M. CARY NELSON, *Primary Examiner.*

MARTIN P. SCHWADRON, *Examiner.*

S. SCOTT, *Assistant Examiner.*